United States Patent [19]
Oguro

[11] Patent Number: 6,026,212
[45] Date of Patent: Feb. 15, 2000

[54] DIGITAL VIDEO RECORDER

[75] Inventor: Masaki Oguro, Tokyo, Japan

[73] Assignee: Sony Corporation, Tokyo, Japan

[21] Appl. No.: 08/943,976

[22] Filed: Oct. 31, 1997

Related U.S. Application Data

[63] Continuation of application No. 08/574,516, Dec. 19, 1995, abandoned.

[30]    Foreign Application Priority Data

Dec. 28, 1994  [JP]  Japan .................................. 6-339542
Dec. 26, 1997  [JP]  Japan .................................. 6-337379

[51] Int. Cl.$^7$ ..................................................... H04N 5/76
[52] U.S. Cl. ............................................. 386/67; 386/109
[58] Field of Search .................... 386/46, 67, 127, 386/95, 96, 68, 112, 111, 109, 124; H04N 5/76

[56]            References Cited

U.S. PATENT DOCUMENTS

| | | | |
|---|---|---|---|
| 4,862,292 | 8/1989  | Enari et al. ............................. | 386/112 |
| 4,963,992 | 10/1990 | Doi et al. ................................ | 386/67 |
| 5,065,259 | 11/1991 | Kubota et al. ........................... | 386/7 |
| 5,148,331 | 9/1992  | Kashida et al. ......................... | 360/32 |
| 5,377,050 | 12/1994 | Yun ......................................... | 386/67 |
| 5,430,579 | 7/1995  | Onishi et al. ........................... | 386/112 |
| 5,491,561 | 2/1996  | Fukuda et al. .......................... | 386/123 |
| 5,583,654 | 12/1996 | Oguro ..................................... | 386/96 |

FOREIGN PATENT DOCUMENTS

| | | |
|---|---|---|
| 0 556 816 | 8/1993  | European Pat. Off. . |
| 0 570 964 | 11/1993 | European Pat. Off. . |
| 0 574 216 | 12/1993 | European Pat. Off. . |
| 0 600 493 | 6/1994  | European Pat. Off. . |
| 0 639 927 | 2/1995  | European Pat. Off. . |

*Primary Examiner*—Huy Nguyen
*Attorney, Agent, or Firm*—Frommer Lawrence & Haug, LLP.; William S. Frommer

[57]            ABSTRACT

A digital video signal is recorded in a first number of tracks in a standard play (SP) mode and in a second number of tracks in a long play (LP) mode, wherein each frame of the digital video signal is recorded in first and second sets of tracks in the SP mode and in only a first set of tracks in the LP mode, each track having subcode data recorded therein for locating frames during a high speed search of the record medium. The digital video signal is compressed prior to recording in both the SP and LP modes, with the compression ratio being greater in the LP mode. When the digital video signal is recorded in the SP mode, the subcode data is of a first type for recording in the first set of tracks and is of a second type for recording in the second set of tracks; whereas when the digital video signal is recorded in the LP mode, only one type of subcode data is recorded. Hence, in the SP mode, a frame of compressed digital video signals includes subcode data of both types; and in the LP mode, a frame of compressed digital video signals contains subcode data of only one type.

28 Claims, 17 Drawing Sheets

Fig. 1

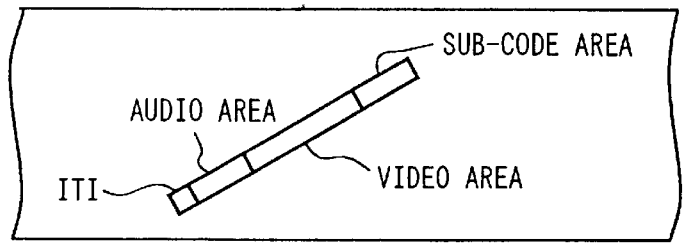

Fig. 3

| SYNC BLOCK NUMBER | | SUB-CODE DATA | |
|---|---|---|---|
| MAIN AREA | OPTIONAL AREA | FIRST HALF OF VIDEO FRAMES | SECOND HALF OF VIDEO FRAMES |
| S B 3 | S B 0 | T T C | T T C |
| S B 4 | S B 1 | TTC OR TBG OR NOI | VRD OR ARD OR NOI |
| S B 5 | S B 2 | T T C | VRT OR ART OR NOI |
| S B 9 | S B 6 | T T C | T T C |
| S B 10 | S B 7 | TTC OR TBG OR NOI | VRD OR ARD OR NOI |
| S B 11 | S B 8 | T T C | VRT OR ART OR NOI |

TTC: TITLE TIME CODE PACK
TBG: TITLE BINARY GROUP PACK
NOI: NO INFO PACK
VRD: VAUX RECORDING YEAR-MONTH-DAY PACK
VRT: VAUX RECORDING TIME PACK
ARD: AAUX RECORDING YEAR-MONTH-DAY PACK
ART: AAUX RECORDING TIME PACK

Fig. 4
| PC0 | HEADER |
|---|---|
| PC1 | |
| PC2 | |
| PC3 | |
| PC4 | |
Fig. 5A
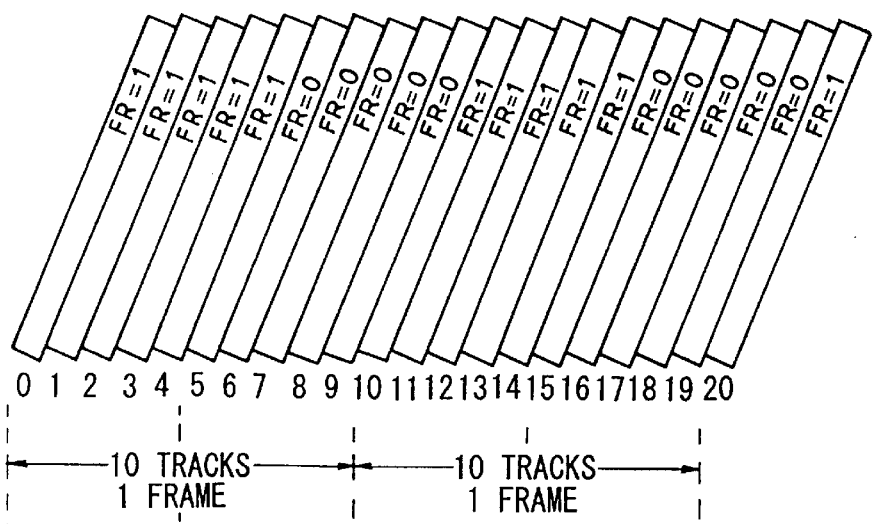
Fig. 5B
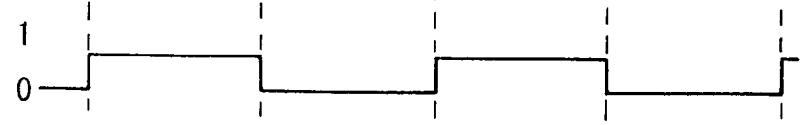

Fig. 10A

| | MSB | | | | | | | LSB |
|---|---|---|---|---|---|---|---|---|
| PC 0 | 0 | 0 | 0 | 1 | 0 | 0 | 1 | 1 |
| PC 1 | BF | 1 | TENS OF FRAMES | | | UNITS OF FRAMES | | |
| PC 2 | 1 | TENS OF SECONDS | | | UNITS OF SECONDS | | | |
| PC 3 | 1 | TENS OF MINUTES | | | UNITS OF MINUTES | | | |
| PC 4 | 1 | 1 | TENS OF HOURS | | | UNITS OF HOURS | | |

Fig. 10B

| | MSB | | | | | | | LSB |
|---|---|---|---|---|---|---|---|---|
| PC 0 | 0 | 0 | 0 | 1 | 0 | 0 | 1 | 1 |
| PC 1 | S2 | S1 | TENS OF FRAMES | | | UNITS OF FRAMES | | |
| PC 2 | S3 | TENS OF SECONDS | | | UNITS OF SECONDS | | | |
| PC 3 | S4 | TENS OF MINUTES | | | UNITS OF MINUTES | | | |
| PC 4 | S6 | S5 | TENS OF HOURS | | | UNITS OF HOURS | | |

| BIT NUMBER | S1 | S2 | S3 | S4 | S5 | S6 |
|---|---|---|---|---|---|---|
| VITC | 14 | 15 | 35 | 55 | 74 | 75 |
| LTC | 10 | 11 | 27 | 43 | 58 | 59 |

WHERE VITC: VERTICAL INTERVAL TIME
LTC : LINER TIME CODE

Fig. 11

| | MSB | | | | | | | LSB |
|---|---|---|---|---|---|---|---|---|
| PC0 | 0 | 0 | 0 | 1 | 0 | 1 | 0 | 0 |
| PC1 | BINARY GROUP 2 |||| BINARY GROUP 1 ||||
| PC2 | BINARY GROUP 4 |||| BINARY GROUP 3 ||||
| PC3 | BINARY GROUP 6 |||| BINARY GROUP 5 ||||
| PC4 | BINARY GROUP 8 |||| BINARY GROUP 7 ||||

Fig. 12

| | MSB | | | | | | | LSB |
|---|---|---|---|---|---|---|---|---|
| PC0 | 0 | 0 | 0 | 1 | 0 | 1 | 0 | 0 |
| PC1 | DS | TM | TENS OF TIME ZONE || UNITS OF TIME ZONE ||||
| PC2 | 1 | 1 | TENS OF DAY || UNITS OF DAY ||||
| PC3 | WEEK ||| TNMN | UNITS OF MONTH ||||
| PC4 | TENS OF YEAR |||| UNITS OF YEAR ||||

Fig. 13

| | MSB | | | | | | | LSB |
|---|---|---|---|---|---|---|---|---|
| PC0 | 0 | 1 | 1 | 0 | 0 | 0 | 1 | 1 |
| PC1 | 1 | 1 | TENS OF FRAMES | | UNITS OF FRAMES | | | |
| PC2 | 1 | TENS OF SECONDS | | | UNITS OF SECONDS | | | |
| PC3 | 1 | TENS OF MINUTES | | | UNITS OF MINUTES | | | |
| PC4 | 1 | 1 | TENS OF HOURS | | UNITS OF HOURS | | | |

Fig. 14

| | MSB | | | | LSB | | | |
|---|---|---|---|---|---|---|---|---|
| PC0 | 0 | 1 | 0 | 1 | 0 | 0 | 1 | 0 |
| PC1 | DS | TM | TENS OF TIME ZONE | UNITS OF TIME ZONE | | | | |
| PC2 | 1 | 1 | TENS OF DAY | UNITS OF DAY | | | | |
| PC3 | WEEK | | | TNMN | UNITS OF MONTH | | | |
| PC4 | TENS OF YEAR | | | | UNITS OF YEAR | | | |

Fig. 15

| | MSB | | | | | | | LSB |
|---|---|---|---|---|---|---|---|---|
| P C 0 | 0 | 1 | 0 | 1 | 0 | 0 | 1 | 1 |
| P C 1 | 1 | 1 | TENS OF FRAMES | | UNITS OF FRAMES | | | |
| P C 2 | 1 | TENS OF SECONDS | | | UNITS OF SECONDS | | | |
| P C 3 | 1 | TENS OF MINUTES | | | UNITS OF MINUTES | | | |
| P C 4 | 1 | 1 | TENS OF HOURS | | UNITS OF HOURS | | | |

Fig. 16

| TRACK | T0 | T1 | T2 | T3 | T4 | T5 | T6 | T7 | T8 | T9 | |
|---|---|---|---|---|---|---|---|---|---|---|---|
| SB11 | TTC | TTC | TTC | TTC | TTC | VRT OR ART OR NOI | VRT OR ART OR NOI | VRT OR ART OR NOI | VRT OR ART OR NOI | VRT OR ART OR NOI | MAIN AREA |
| SB10 | TTC OR TBG OR NOI | TTC OR TBG OR NOI | TTC OR TBG OR NOI | TTC OR TBG OR NOI | TTC OR TBG OR NOI | VRD OR ARD OR NOI | VRD OR ARD OR NOI | VRD OR ARD OR NOI | VRD OR ARD OR NOI | VRD OR ARD OR NOI | |
| SB9 | TTC | TTC | TTC | TTC | TTC | TTC | TTC | TTC | TTC | TTC | |
| SB8 | f | c | f | c | f | m | i | m | i | m | OPTIONAL AREA |
| SB7 | e | b | e | b | e | k | h | k | h | k | |
| SB6 | d | a | d | a | d | j | g | j | g | j | |
| SB5 | TTC | TTC | TTC | TTC | TTC | VRT OR ART OR NOI | VRT OR ART OR NOI | VRT OR ART OR NOI | VRT OR ART OR NOI | VRT OR ART OR NOI | MAIN AREA |
| SB4 | TTC OR TBG OR NOI | TTC OR TBG OR NOI | TTC OR TBG OR NOI | TTC OR TBG OR NOI | TTC OR TBG OR NOI | VRD OR ARD OR NOI | VRD OR ARD OR NOI | VRD OR ARD OR NOI | VRD OR ARD OR NOI | VRD OR ARD OR NOI | |
| SB3 | TTC | TTC | TTC | TTC | TTC | TTC | TTC | TTC | TTC | TTC | |
| SB2 | c | f | c | f | c | i | m | i | m | i | OPTIONAL AREA |
| SB1 | b | e | b | e | b | h | k | h | k | h | |
| SB0 | a | d | a | d | a | g | j | g | j | g | |

A FRAME OF SP MODE
10 TRACKS

Fig. 17

| TRACK | T0 | T1 | T2 | T3 | T4 | T5 | T6 | T7 | T8 | T9 | |
|---|---|---|---|---|---|---|---|---|---|---|---|
| SB11 | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | MAIN AREA |
| SB10 | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | |
| SB9 | TTC | TTC | TTC | TTC | TTC | TTC | TTC | TTC | TTC | TTC | |
| SB8 | m | i | m | i | m | m | i | m | i | m | OPTIONAL AREA |
| SB7 | k | h | k | h | k | k | h | k | h | k | |
| SB6 | j | g | j | g | j | j | g | j | g | j | |
| SB5 | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | VRT OR ART OR NOI | MAIN AREA |
| SB4 | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | VRD OR ARD OR NOI | |
| SB3 | TTC | TTC | TTC | TTC | TTC | TTC | TTC | TTC | TTC | TTC | |
| SB2 | i | m | i | m | i | i | m | i | m | i | OPTIONAL AREA |
| SB1 | h | k | h | k | h | h | k | h | k | h | |
| SB0 | g | j | g | j | g | g | j | g | j | g | |

← 1 FRAME OF HIGH-COMPRESSION LP MODE 5 TRACKS → ← 1 FRAME OF HIGH-COMPRESSION LP MODE 5 TRACKS →

Fig. 21

| TRACK | T0 | T1 | T2 | T3 | T4 | T5 | T6 | T7 | T8 | T9 | |
|---|---|---|---|---|---|---|---|---|---|---|---|
| SB11 | TTC | TTC | TTC | TTC | TTC | VRT OR ART OR NOI | VRT OR ART OR NOI | VRT OR ART OR NOI | VRT OR ART OR NOI | VRT OR ART OR NOI | MAIN AREA |
| SB10 | TTC OR TBG OR NOI | TTC OR TBG OR NOI | TTC OR TBG OR NOI | TTC OR TBG OR NOI | TTC OR TBG OR NOI | VRD OR ARD OR NOI | VRD OR ARD OR NOI | VRD OR ARD OR NOI | VRD OR ARD OR NOI | VRD OR ARD OR NOI | |
| SB9 | TTC | TTC | TTC | TTC | TTC | TTC | TTC | TTC | TTC | TTC | |
| SB8 | f | c | f | c | f | m | i | m | i | m | OPTIONAL AREA |
| SB7 | e | b | e | b | e | k | h | k | h | k | |
| SB6 | d | a | d | a | d | j | g | j | g | j | |
| SB5 | TTC | TTC | TTC | TTC | TTC | VRT OR ART OR NOI | VRT OR ART OR NOI | VRT OR ART OR NOI | VRT OR ART OR NOI | VRT OR ART OR NOI | MAIN AREA |
| SB4 | TTC OR TBG OR NOI | TTC OR TBG OR NOI | TTC OR TBG OR NOI | TTC OR TBG OR NOI | TTC OR TBG OR NOI | VRD OR ARD OR NOI | VRD OR ARD OR NOI | VRD OR ARD OR NOI | VRD OR ARD OR NOI | VRD OR ARD OR NOI | |
| SB3 | TTC | TTC | TTC | TTC | TTC | TTC | TTC | TTC | TTC | TTC | |
| SB2 | c | f | c | f | c | i | m | i | m | i | OPTIONAL AREA |
| SB1 | b | e | b | e | b | h | k | h | k | h | |
| SB0 | a | d | a | d | a | g | j | g | j | g | |

← 1 FRAME OF HIGH-COMPRESSION LP MODE 5 TRACKS → ← 1 FRAME OF HIGH-COMPRESSION LP MODE 5 TRACKS →

1

DIGITAL VIDEO RECORDER

This application is a continuation of application Ser. No. 08/574,516, filed Dec. 19, 1995 abandoned.

BACKGROUND OF THE INVENTION

This invention relates to digital video signal recording in a standard play (SP) mode or in a long play (LP) mode, with the digital video signals being recorded with a higher compression ratio in the LP mode than in the SP mode so that a lesser number of tracks may be used to record a frame in the LP mode than in the SP mode. More particularly, this invention is concerned with the recording of subcode data in respective tracks for both the SP and LP modes.

Digital video tape recorders capable of recording digital video signals on a magnetic tape in a cassette, known as D-VCR's, utilize data compression techniques for reducing the amount of data that must be recorded to permit accurate reproduction and display of a video picture. Typically, data compression relies upon discrete cosine transformation (DCT) and variable length encoding. A video frame, after being digitized and compressed, is recorded in a number of tracks, with each track exhibiting the general format shown in FIG. 1. This format includes an ITI area located at the leading portion of each track, followed by an audio area, a video area and a subcode area in this order. The ITI area is used as a timing block to assure the proper positioning of the tape and locating of individual tracks during, for example, an after-recording operation which is used to edit the tape. The audio and video areas contain digital audio and digital video data which, typically, are compressed. Subcode data is recorded in the subcode area and contains information which is useful for quickly locating particular video pictures, frames and tracks during a high speed search. For example, time codes, track numbers, and the like are included in the subcode data that is recorded in the subcode area. Typically, one frame of a video picture that is represented as a video signal in the NTSC standard (also referred to herein as the 525/60 standard) is recorded in ten successive tracks and a video picture represented by the PAL standard (also referred to as the 625/50 standard) is recorded in twelve successive tracks.

FIG. 2A is a schematic representation of the subcode data recorded in the subcode area in each track (whether recorded in the NTSC or PAL standard); and it is seen that the subcode data is comprised of twelve sync blocks SB0–SB11. A single sync block is schematically illustrated in FIG. 2B and is seen to include twelve bytes. The structure of a sync block is the same for each of sync blocks SB0–SB11; but the data content of the respective sync blocks varies, as will be described.

The twelve bytes of a sync block include two bytes which form a synchronizing pattern SYNC followed by two bytes of identifying data ID0 and ID1. A parity byte IDP follows the ID byte ID1 and is used to correct errors that may be present in the identifying bytes. Five bytes of data are recorded after the parity byte IDP, these five bytes being recorded in a data structure known as a pack which is described further below. Two parity bytes follow the data pack, thereby constituting the twelve byte sync block. Those familiar with digital video recorders will appreciate that the sync block included in the subcode data is shorter (i.e. it includes a smaller number of bytes) than the sync blocks which are included in the audio and video areas.

The identifying bytes ID0 and ID1 that are included in the subcode data recorded in a given track are not the same for all of the sync blocks included in that subcode data. For example, FIG. 2C schematically illustrates the identifying bytes ID0 and ID1 for sync blocks SB0 and SB6; and FIG. 2D illustrates the identifying bytes ID0 and ID1 for the sync blocks SB1–SB5 and SB7–SB11. In the example illustrated, the identifying bytes of sync blocks SB0 and SB6 differ from the identifying bytes of the remaining sync blocks. Byte ID0 in all of the sync blocks includes a flag F/R which is used in a high speed search to detect the first track in a frame of digital video signals. This F/R flag also is helpful in detecting an address not only for that track but for other tracks; and for convenience, this flag is referred to herein as an address-detecting flag. However, this term is not intended to be used as a limitation or as a strict definition for this F/R flag but, rather, is used simply to identify this flag.

As seen in FIG. 2C, the ID0 byte in sync block SB0 (and also in sync block SB6) includes a 3-bit application identifier AP3 followed by a digital representation of an absolute track number. The absolute track number is represented by eight bits, four of which are included in the ID0 byte and the remaining four are included in the ID1 byte. The last four bits of the ID1 byte for sync block SB0 (and also for sync block SB6) represent a sync number.

The data of the ID0 byte in sync blocks SB1–SB5 and SB7–SB11 differ from the data of the ID0 byte for sync blocks SB0 and SB6 in that, as shown in FIG. 2D, the application identifying bits AP3 found in sync blocks SB0 and SB6 are replaced by three bits which represent an index identifier, a skip identifier and a photopicture identifier. The index identifier is used during an index search; the skip identifier is used to indicate when a particular frame is to be skipped during a search and playback mode, and the photopicture identifier is used to identify a frame which represents a still picture. The remaining bits of the ID0 byte and of the ID1 byte in sync blocks SB1–SB5 and SB7–SB11 represent the same data as the corresponding bits in the ID0 and ID1 bytes in sync blocks SB0 and SB6.

Some of the sync blocks included in the subcode data are designated as "main area" sync blocks and the remaining sync blocks in the subcode data are designated as "optional area" sync blocks. For example, sync blocks SB3, SB4, SB5, SB9, SB10 and SB11 are main area sync blocks; whereas sync blocks SB0, SB1, SB2, SB6, SB7 and SB8 are optional area sync blocks. This different designation is used in conjunction with the five bytes of data that are present in each sync block, as shown in FIG. 2B, and as referred to hereinabove as the data pack.

When data is recorded in accordance with the NTSC (or 525/60) standard, a video frame is recorded in ten tracks, with the type of subcode data recorded in the data packs of the first five tracks (or first half of the frame) being different from the type of subcode data that is recorded in the data packs of the second five tracks (or second half) of the video frame. FIG. 3 is a table which represents the type of subcode data that is recorded in the main area of the subcode data in the first half of the video frame and in the second half of the video frame. It is seen that in the first half of the video frame, the data pack recorded in sync blocks SB3, SB5, SB9 and SB11 of each subcode area represents TTC (or title time code) data, and this pack simply is referred to as the TTC pack. In sync blocks SB4 and SB10 of the first half of the video frame, the data pack may be a TTC pack or, if the digital video signal is recorded for business use (as opposed to personal use), the data pack may be a title binary group (TBG) pack. Typically, for personal use, that is, for the usual consumer use, TBG packs are not recorded. As yet another alternative, the data packs recorded in sync blocks SB4 and SB10 in the first half of a video frame may represent no useful information, and such data packs are referred to as "no info" (NOI) packs.

In those tracks which constitute the second half of the video frame, TTC packs are recorded in sync blocks SB3 and SB9. The data packs included in sync blocks SB4 and SB10 may represent the date (year-month-day) on which the video signal is recorded, known as the VRD pack or they may represent the data on which the audio data is recorded, known as the ARD pack. The user may select whether the VRD or the ARD pack is recorded. If neither pack is included in these sync blocks, the data pack therein is referred to as the NOI pack.

In sync blocks SB5 and SB11 of the subcode data recorded in those tracks which constitute the second half of the video frame, a data pack is recorded representing the time (hour-minute-second) at which the video signal is recorded, and this is known as the VRT pack. Alternatively, the data pack may represent the time at which the audio signal is recorded, and this data pack then is known as the ART pack. If time data is not included in sync blocks SB5 and SB11, the data pack therein is represented as the NOI pack.

The subcode data recorded in the optional areas, namely sync blocks SB0, SB1, SB2, SB6, SB7 and SB8, may be user-designated; and in proposals that have been made heretofore for D-VCR's, it has been recommended that if there is no user designation for the recording of subcode data in the optional areas, such optional areas should record the same subcode data as are recorded in the main areas of that track.

The foregoing description of FIG. 3 has assumed the recording of NTSC (525/60) data in ten tracks. The same subcode data configuration may be used for the recording of PAL (625/50) video data in twelve tracks. Of course, in the PAL (625/50) standard, each half of a video frame consists of six tracks. Thus, in both the NTSC (525/60) and PAL (625/50) standards, the subcode data which is recorded in the first half of the video frame is of a different type than the subcode data which is recorded in the second half of the video frame, as is evident from the subcode data recorded in sync blocks SB4, SB5, SB10 and SB11 in each half.

A data pack which constitutes the TTC, TBG, VRD, ARD, VRT, ART or NOI pack exhibits the data structure shown in FIG. 4. Byte PC0 is referred to as the header, which identifies the data pack (for example, the header identifies the data pack as the TTC, TBG, VRD, ART, VRT, ART or NOI pack) and bytes PC1–PC4 constitute the appropriate data, such as date, time, etc. It is appreciated that each sync block, such as shown in FIG. 2B, contains only one data pack.

The subcode data shown in FIGS. 2A–2D and 3 are recorded with the compressed digital video signal in the standard play (SP) mode. It has been proposed that digital video signals may be data-compressed with a higher degree of compression for recording in a long play (LP) mode, such that the ten tracks of data that are used to represent one NTSC frame may be reduced to five tracks of data (similarly, the twelve tracks of data that are used to represent a PAL frame may be reduced to six tracks of data). By reducing by one-half the number of tracks needed to record a frame of digital video data, twice the amount of data may be recorded; and as a result, the recording time for a given length of tape may be doubled. That is, twice the amount of data or twice the duration of a video program may be recorded in the LP mode than may be recorded in the SP mode.

When data is recorded in the SP mode, ten tracks in the NTSC system and twelve tracks in the PAL system constitute one unit. The recording of subcode data is based upon this unit; and as is shown in FIG. 3, the type of subcode data that is recorded in the first half of this unit differs from the type of subcode data that is recorded in the second half of this unit. Nevertheless, high speed searching as well as the compilation of title, time, date, duration, etc., all of which are useful for searching or for display to a user, are based upon the 10-track (or 12-track) unit. Conveniently, this 10-track (or 12-track) unit constitutes a single frame unit and searching, as well as compilation, thus may be based upon a single frame unit. However, when video data is recorded in the LP mode, the 10-track (or 12-track) unit now represents two frames; and searching as well as compilation now is dependent upon a 2-frame unit. If the subcode data recording mechanism and algorithms which are used to record the subcode data during the SP mode (as represented in FIG. 3) also are used to record the subcode data in the LP mode, it is appreciated that the type of subcode data that is recorded with one LP frame (such as an odd frame) differs from the type of subcode data that is recorded with the following (or even) LP frame. This is because, when using the same subcode data mechanism or algorithm, the type of subcode data that is recorded in the first five (or six) tracks differs from the type of subcode data that is recorded in the second five (or six) tracks. As a result, whereas video data that is recorded in the SP mode can be edited on a frame-by-frame basis, that is, on the basis of a single frame unit, video data that is recorded in the LP mode can be edited only on a 2-frame unit basis. This is particularly troublesome when a common video tape has one video program recorded thereon in the SP mode and another video program recorded in the LP mode.

Another difficulty that arises when the video data may be recorded in the SP or LP mode relates to the state of the F/R flag. In the SP mode, the F/R flag exhibits a "1" during those tracks which constitute the first half of the video frame and a "0" in those tracks which constitute the second half of the video frame. FIGS. 5A and 5B illustrate the F/R flag for the NTSC standard. It is seen, therefore, that the F/R flag changes over from "0" to "1" at the first track in each frame and changes over from a "1" to a "0" at the sixth track of the 10-track frame. Since the change-over of the F/R flag as well as its state can be used to locate a particular track, the F/R flag is referred to herein as an address-detecting flag and is used during a high speed search to position the tape at the beginning of a frame.

If the same subcode recording mechanism or algorithm is used during the LP mode, the F/R flag changes over between "0" and "1" every five tracks which, for the NTSC system, means that the F/R flag changes its state at the beginning of each frame, as shown in FIGS. 6A–6B. However, if the beginning of a frame is detected by sensing the change-over of the F/R flag from "0" to "1", this technique will permit the beginning of only every other frame, such as the beginning of every odd frame, to be sensed because the F/R flag changes over from "1" to "0" at the beginning of every even frame. Thus, by sensing "0" to "1" transitions, the beginning of the even frames will not be detected.

As a result of this discrepancy, it is necessary, during a search operation, to provide some indication of whether the video signal on the digital video tape had been recorded in the SP or LP mode. Depending upon the mode used for recording, different searching techniques are used to locate a desired video picture or to identify the beginning of a video frame. Optimally, the algorithm shown in FIG. 7 is carried out before a searching operation is initiated. As depicted by the flow chart shown in FIG. 7, before a searching operation is initiated, inquiry S101 should be made to determine whether the video data to be searched was recorded in the SP or LP mode. If it is determined that the video data was recorded in the SP mode, inquiry S102 is made to determine when the F/R flags undergoes a positive transition from "0" to "1". When this inquiry is answered in the affirmative, instruction S103 is carried out to indicate that the first track in a frame is in position to be played back. However, if inquiry S101 determines that the video data had been recorded in the LP mode, inquiry S104 is made to sense when the F/R flag undergoes either a positive or negative transition. When such a transition is sensed, instruction S105 is carried out to indicate that the first track in a frame has been reached and is in position to be played back.

While the algorithm shown in FIG. 7 appears to be readily implemented, this algorithm is dependent upon inquiry S101 which, in many instances, is far more complicated than would appear. It would seem that if the video data recorded on a video cassette is known to have been recorded in the SP or LP mode, it would be a relatively simple matter to implement and respond to inquiry S101. For example, a user may provide a simple indication, such as providing suitable visual indicia on the video cassette, to indicate whether the video data recorded thereon has been recorded in the SP or LP mode. In some instances, however, a single video cassette may include video data that is recorded in one portion thereof in the SP mode and in another portion thereof in the LP mode. The recording of video data in mixed modes does not permit simple visual indicia to identify the mode or modes in which the video data had been recorded. Consequently, it is not a simple matter to determine whether inquiry S102 or inquiry S104 of the algorithm shown in FIG. 7 should be made. As a result, it would be difficult to search the video tape at a high speed, such as 200 times normal speed, to position the first track of the proper frame at the appropriate location for playing back that frame. It will be appreciated that, depending upon whether inquiry S102 or S104 is implemented, the video tape may be positioned at the beginning of the second half of a SP frame or, alternatively, the video tape may be positioned only at the beginning of odd LP frames, thus making it difficult, if not impossible, to position the tape at the beginning of an even LP frame.

If, for example, it cannot be determined prior to initiating a high speed search whether the video data had been recorded in the SP or LP mode, a search for a positive "0" to "1" transition in the F/R flag may be satisfactory to position the first track of each frame in the SP mode, but, as shown in FIGS. 8A and 8B, this technique will position the first track in only frames F2, F4, F6, etc. for those frames that had been recorded in the LP mode. Alternatively, if a negative transition from "1" to "0" of the F/R flag is sensed, it is seen that the first track in each of frames F3, F5, F7, etc. will be properly positioned for the video data recorded in the LP mode, but track 5 (the first track in the second half of a SP frame) will be positioned to play back the video data recorded in the SP mode. Typically, the sensing of the middle of a frame of video data during a high speed search is undesired and often unnecessary.

OBJECT OF THE INVENTION

Therefore, it is an object of the present invention to provide a digital video recorder which permits frames to be searched and subcode data to be compiled in a single frame unit irrespective of whether the video data was recorded in the SP or LP mode.

Another object of this invention is to provide a digital video recorder which permits the high speed searching of a video tape so as to position that tape at the first track of a frame, based upon the F/R flag recorded in each track, irrespective of whether the video data was recorded in the SP or LP mode.

A further object of this invention is to provide a digital video recorder operable to record video data in either the SP or LP mode, and wherein the same subcode recording/detecting mechanism or algorithm may be used irrespective of whether the video data is recorded in the SP or LP mode.

An additional object of this invention is to provide a digital video recorder operable in either the SP or LP mode, which permits the high speed searching of frames in order to position the record medium at the beginning of a video frame as a function of the F/R flag recorded in each track, irrespective of whether the video data had been recorded in the SP or LP mode.

Still another object of this invention is to provide a common subcode recording mechanism or algorithm that can be used in both the SP and LP modes.

Yet a further object of this invention is to provide a common subcode detecting mechanism or algorithm that can be used for searching or compilation of video data irrespective of whether that video data had been recorded in the SP or LP mode.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for recording a digital video signal in a first number of tracks on a record medium in a standard play (SP) mode and in a second number of tracks in a long play (LP) mode, wherein each frame of the digital video signal is recorded in first and second sets of tracks in the SP mode and in only the first set of tracks in the LP mode. Subcode data is recorded in respective tracks for locating frames during a high speed search or for providing user data during a compilation operation of the subcode data during such high speed search. First and second video data compressors are provided for compressing the digital video signal in the SP and LP modes, respectively, the second video data compressor exhibiting a compression ratio greater than that of the first video data compressor. Depending upon which mode is to be used, the first or second video data compressor is selected. A subcode data generator generates subcode data of a first type for recording in the first set of tracks and of a second type for recording in the second set of tracks. Consequently, subcode data of the first and second types are recorded with a frame of compressed digital video signals in the SP mode and subcode data of only the first type are recorded with a frame of compressed digital video signals in the LP mode.

For example, in the SP mode, NTSC (or 525/60) data are recorded in ten tracks per frame, with the subcode data recorded in the first five tracks being of a different type than the subcode data recorded in the second five tracks. However, when that same video data is recorded in the LP mode, one video frame is recorded in five tracks; and the subcode data recorded in those tracks is the same as the subcode data recorded in, for example, the second set of five tracks which are included in an SP mode frame.

As a feature of this invention, the subcode data includes an F/R flag recorded in each track, with this F/R flag undergoing a positive (0 to 1) transition at the beginning of a frame and a negative transition at the middle of the frame when the video data is recorded in the SP mode; whereas when the video data is recorded in the LP mode, the F/R flag undergoes a positive transition at the beginning of the frame and a negative transition in the vicinity of the middle of the frame. For example, if the video data originally is in the NTSC standard, the F/R flag undergoes a positive transition at the beginning of a frame and a negative transition at the fourth track in that frame when the video data is recorded in the LP mode. If the video data had been recorded in the PAL standard, the F/R flag undergoes a positive transition at the beginning of the frame and a negative transition at the fourth track included in that frame when recorded in the LP mode. (Of course, opposite transitions are contemplated, that is, a negative transition may be present at the beginning of the frame and a positive transition in the F/R flag may be present in the vicinity of the middle of the frame.)

As yet another feature of this invention, apparatus are provided for reproducing the digital video signal recorded in the aforementioned manner. Thus, for executing a high speed search, whether the video data had been recorded in the SP or LP mode, subcode data recorded in only one set of tracks for the SP mode are detected; and the same subcode data are detected for those digital video signals that had been recorded in the LP mode. That is, there is no need to provide different criteria for searching the subcode data for the SP and LP modes: the same criterion may be used for both modes because a common type of subcode data recorded in both SP and LP frames is sensed.

As yet another aspect of this invention, in video reproducing apparatus of the aforementioned type, the same transition in the F/R flag (e.g. a positive transition) is detected in order to position the record medium at the first track of a video frame, irrespective of whether that frame had been recorded in the SP or LP mode. There is no need to provide separate detecting mechanisms or algorithms for positioning the record medium, depending upon whether that medium had been recorded in the SP or LP mode.

BRIEF DESCRIPTION OF THE DRAWINGS

The following detailed description, given by way of example, will best be understood in conjunction with the accompanying drawings in which:

FIG. 1 is a schematic representation of one track of digital video data recorded on, for example, a digital video tape;

FIG. 3 is a chart illustrating the subcode data recorded in the main area of the subcode area of the different tracks which constitute a video frame;

FIG. 4 is a schematic representation of a data pack;

FIGS. 5A and 5B are schematic representations of the F/R flag recorded in respective tracks of video frames that had been recorded in the SP mode of operation:

FIGS. 10A–10B schematically illustrate the TTC pack recorded by the apparatus shown in FIG. 9;

FIG. 11 schematically illustrates a TBC pack recorded by the apparatus shown in FIG. 9;

FIG. 12 schematically illustrates the VRD pack recorded by the apparatus shown in FIG. 9;

FIG. 13 schematically illustrates the VRT pack recorded by the apparatus shown in FIG. 9;

FIG. 14 schematically illustrates the ARD pack recorded by the apparatus shown in FIG. 9;

FIG. 15 schematically illustrates the ART pack recorded by the apparatus shown in FIG. 9;

FIG. 16 schematically represents the subcode data recorded in the respective tracks of an NTSC frame recorded in the SP mode;

FIG. 17 schematically represents the subcode data recorded in the respective tracks of successive frames recorded in the LP mode;

FIG. 17 is recorded;

FIG. 21 schematically represents subcode data that would be recorded in tracks of successive frames of LP video data that otherwise would be recorded by techniques proposed heretofore;

DETAILED DESCRIPTION OF PREFERRED EMBODIMENTS

Figure 9:
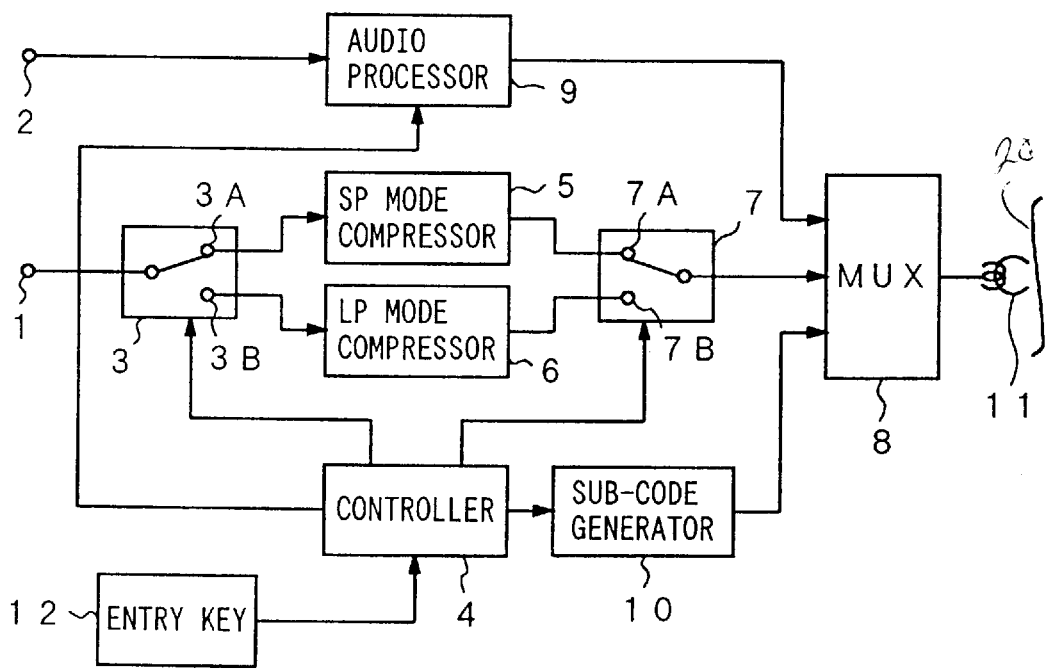
FIG. 9 is a block diagram of a digital video recorder in which the present invention finds ready application.
Figures 8A, 8B:
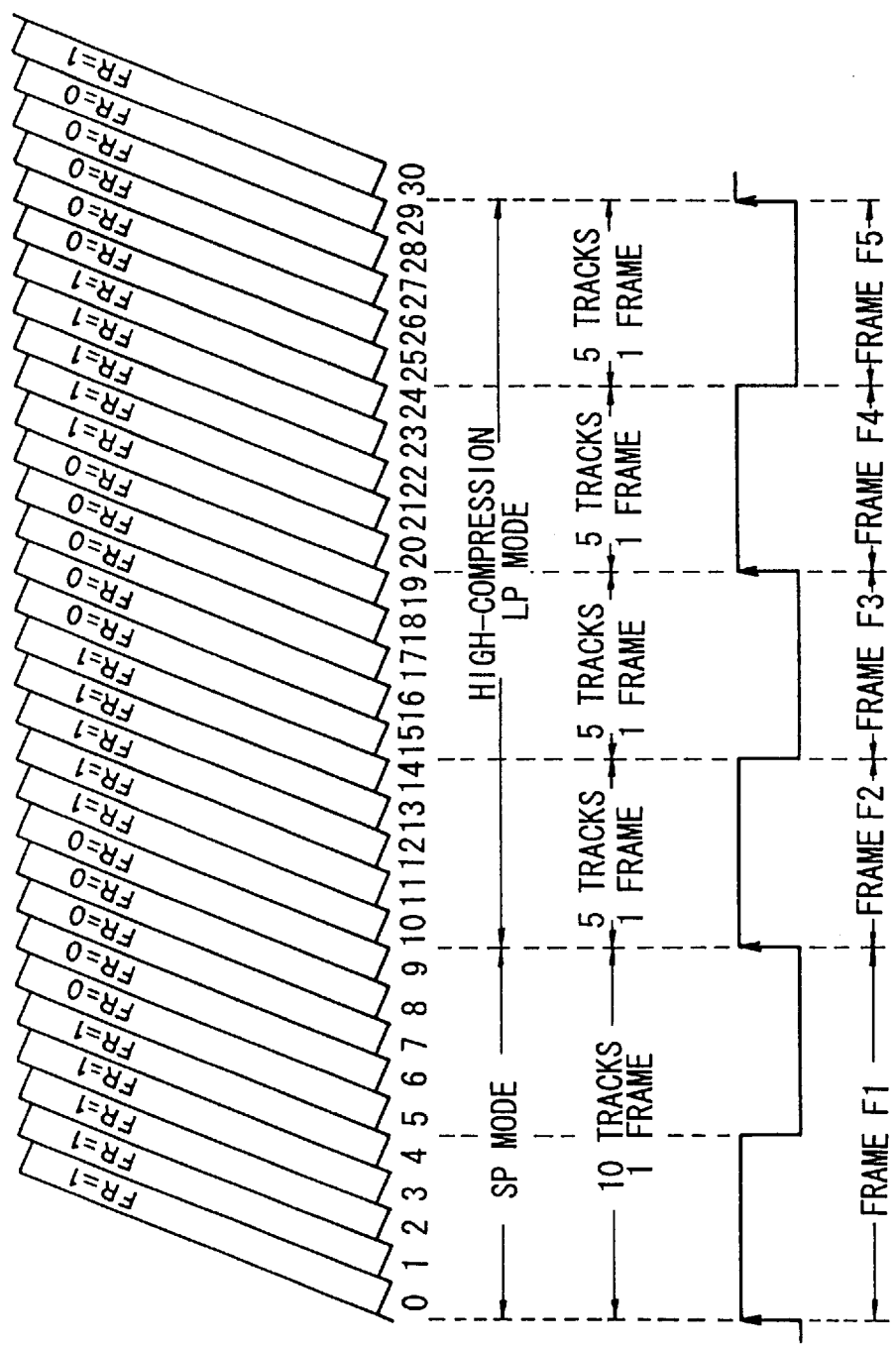
FIGS. 8A and 8B are schematic representations of a record medium in which digital video data are recorded in both SP and LP modes.

One embodiment of digital video recording apparatus which incorporates the present invention is illustrated in the block diagram of FIG. 9. In this embodiment, video data supplied in digital form at input terminal 1 and audio data supplied at input terminal 2 is recorded by a rotary head 11 on a magnetic tape 20 in either the SP or LP mode. Digital video data supplied to input terminal 1 is coupled by a selector switch 3 either to a video data compressor 5 or a video data compressor 6, these two compressors being operable in the SP and LP modes, respectively. A controller 4 determines the condition of selector 3 in response to a user control supplied to the controller by an entry key 12. For example, if a user selects the standard play mode, controller 4 conditions selector 3 to couple the digital video signal to SP mode compressor 5. If, however, the user had selected the long play mode, controller 4 conditions selector 3 to couple the digital video data from input terminal 1 to LP mode compressor 6. Another selector 7 couples either SP mode compressor 5 or LP mode compressor 6 to a multiplexer 8, depending upon whether the user had selected the SP or LP mode for recording. As is shown, selector 7 is controlled by controller 4.

Controller 4 also controls an audio processor 9 to process a digital audio signal supplied thereto from audio input terminal 2 in a manner depending upon whether the SP or LP mode had been selected by the user. It will be appreciated that a greater degree of compression is carried out by the audio processor when the LP mode is selected as opposed to when the SP mode is selected. The compressed audio data produced by the audio processor is coupled to multiplexer 8.

Controller 4 also controls the operation of a subcode generator 10 to generate either the subcode data schematically illustrated in FIG. 3 for recording in the main area of the subcode area of each track when the SP mode is selected, or to record only one type of subcode data for each frame when the LP mode is selected. The type of data generated by subcode generator 10 during the SP mode and the type of subcode data generated thereby during the LP mode are described below.

Although not discussed herein, it will be appreciated that compressors 5 and 6 carry out data compression in a manner known to those of ordinary skill in the art, including image decimation, blocking, DCT conversion, variable quantizing, variable length encoding, and so on. If the input video signal admits of the NTSC standard, SP mode compressor 5 cooperates with multiplexer 8 and recording heads 11 to record the compressed video data in ten tracks per frame. Similarly, LP mode compressor 6 cooperates with the multiplexer and recording heads to record the NTSC video signal in the LP mode in five tracks per frame. If, however, the video signal supplied to input terminal 1 is in the PAL standard, SP mode compressor 5 operates to record the compressed video data in twelve tracks per frame in the SP mode; and LP mode compressor 6 operates to record the compressed video data in six tracks per frame in the LP mode.

Multiplexer 8 is operable to record the compressed audio data supplied from audio processor 9, the compressed video data supplied either from SP mode compressor 5 or LP mode compressor 6 and the subcode data supplied from subcode generator 10 in the audio, video and subcode areas shown in FIG. 1. ITI data is supplied to and recorded by multiplexer 8 in the ITI area; but this forms no part of the present invention per se and is not further discussed herein.

Figure 2A:
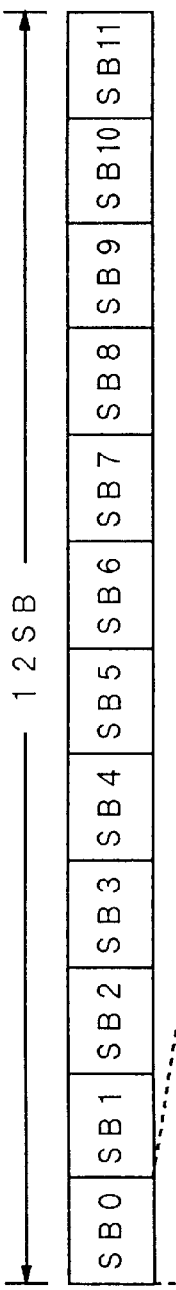
FIGS. 2A–2D are schematic representations of the subcode data recorded in the subcode area shown in FIG. 1.
Figure 2B:
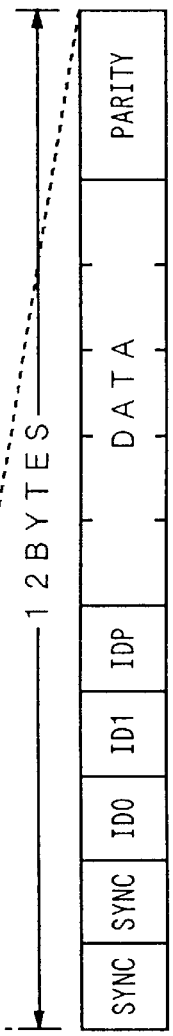
Figure 2C:
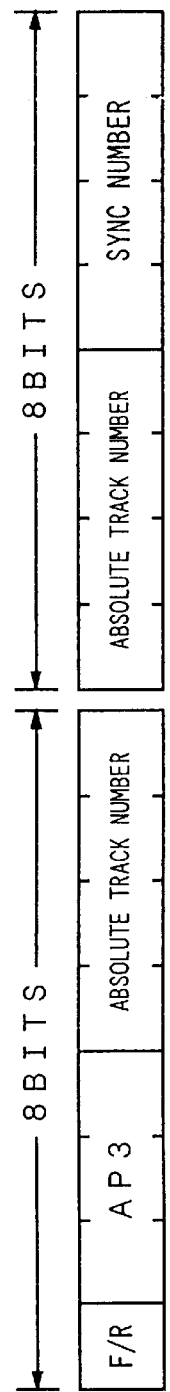
Figure 2D:
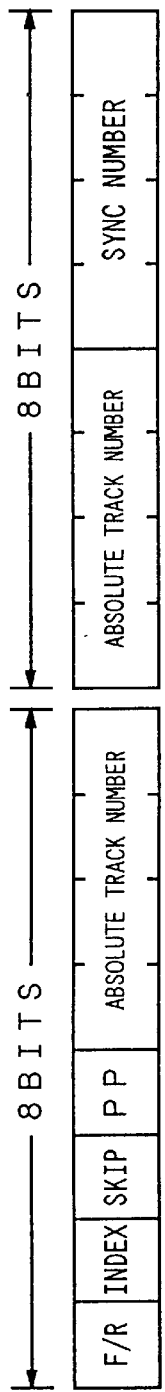

The subcode data supplied by subcode generator 10 admits of the data construction shown in FIGS. 2A–2D; and the data bytes of FIG. 2B are recorded as data packs having the form shown in FIG. 4. The type of data represented by each data pack may be as follows:

FIG. 10A illustrates the title time code (TTC) pack whose header byte PC0 (in hexadecimal form) is "13h". The TTC pack is an indication of elapsed time in hours-minutes-seconds. FIG. 10B illustrates the TTC pack similar to that shown in FIG. 10A, but in FIG. 10B, bit numbers S1–S6 are assigned particular values of the vertical interval time code or the linear time code, as may be selected by the user.

FIG. 11 represents the title binary group (TBG) pack whose header byte PC0 is "14h" in hexadecimal form. As mentioned above, the TBG pack is used primarily for business applications; and is replaced by the TTC pack in the subcode data recorded by consumer use D-VCR's.

FIG. 12 illustrates the video recording date (VRD) pack whose header byte PC0 is "62h" in hexadecimal form. The VRD pack represents the date in year, month and day on which the video data is recorded. Bit DS in byte PC1 indicates whether the date is in standard or Daylight Saving Time; and bit TM indicates whether the time at which the video data is recorded differs from Greenwich mean time by an odd ("1") or even ("0") multiple of a half-hour. For example, video data recorded in India is recorded at a time which differs from Greenwich mean time by an odd multiple of a half-hour. In most of the rest of the world, video data will be recorded at a time which differs from Greenwich mean time by an even multiple of a half-hour.

FIG. 13 illustrates a video recording time (VRT) pack which indicates the time, in hours, minutes and seconds, at which the video data is recorded. Here, the header byte PC0 is "63h" in hexadecimal form.

FIG. 14 illustrates the audio recording date (ARD) pack whose header byte PC0 is "52h" in hexadecimal form. The data recorded in the ARD pack is seen to be substantially the same as the data recorded in the VRD pack.

FIG. 15 illustrates the audio recording time (ART) pack whose header byte PC0 is "53h" in hexadecimal form. It will be seen that the ART pack is substantially the same as the VRT pack.

When subcode data generator 10 operates to generate the subcode data that is recorded in each track of a frame recorded in the SP mode, the first set, or first half, of the tracks contains one type of subcode data and the second set, or second half of the tracks contains a different type of subcode data. Thus, when the digital video data represents an NTSC signal, such that one frame of digital video data is recorded in ten tracks, the first set of five tracks contains one type of subcode data and the second set of five tracks contains a different type of subcode data. Similarly, if the digital video data represents a PAL signal, wherein one frame of the PAL signal is recorded in twelve tracks, the first set of six tracks contains subcode data of one type and the second set of six tracks contains subcode data of a different type. As discussed above in conjunction with FIG. 3, the subcode data is recorded in particular sync blocks which constitute the main area of the subcode data. This subcode data recording format for an NTSC (525/60) video signal recorded in the SP mode is schematically illustrated in FIG. 16. Here, the first set of five tracks T0–T4 contains the subcode data recorded in sync blocks SB0–SB11 in each track. TTC packs are recorded in sync blocks SB3, SB5, SB9 and SB11 in each of tracks T0–T4; and sync blocks SB4 and SB10 in these tracks are recorded with the TTC pack or, if the video data is recorded by a business user, with the TBG pack. If the user wishes not to record the TTC or the TBG pack in sync blocks SB4 and SB10 of tracks T0–T4, no info NOI is recorded. In tracks T0–T4 of the NTSC signal recorded in the SP mode, sync blocks SB0–SB2 and SB6–SB8 are the "optional areas" discussed above in conjunction with FIG. 3.

In the second set of five tracks T5–T9 of the NTSC video signal recorded in the SP mode, the TTC pack is recorded in sync blocks SB3 and SB9; date information represented by the VRD or ARD packs is recorded in sync blocks SB4 and SB10 and time information represented by the VRT or ART packs is recorded in sync blocks SB5 and SB11. As mentioned above, the VRD and ARD packs represent the date (year, month and day) at which the video or audio data (as may be selected by the user) are recorded; and the VRT and ART packs represent the time (hours, minutes, seconds) at which the video or audio data (as may be selected by the user) are recorded.

As illustrated in FIG. 16, TTC information is recorded in both the first and second sets of tracks of a frame recorded in the SP mode; whereas date and time information (which are more useful for a high speed search and for data compilation) are recorded only in the second set of data tracks. As an advantageous feature of the present invention, the time code data which is recorded in the second set of tracks in the SP mode are recorded in the single set of tracks which constitute the frame in the LP mode. That is, whereas an SP-recorded frame includes two sets of tracks, an LP-recorded frame contains only a single set of tracks; and the time code data recorded in this single set of tracks in the LP mode is the same type of data that is recorded in the second set of tracks in the SP mode.

The subcode data format recorded in the main areas of the subcode area in each track included in a frame of digital video data recorded in the LP mode is illustrated in FIG. 17. Here, it is assumed that the video signal is in the NTSC standard and, thus, one frame of the digital video data recorded in the LP mode is comprised of five tracks T0–T4. The next frame of the NTSC digital video data recorded in the LP mode also is comprised of five tracks T5–T9. A comparison between FIGS. 16 and 17 indicates that the set of five tracks which constitute the frame of the NTSC digital video data recorded in the LP mode is of the same type of subcode data that is recorded in the second set of tracks (i.e. five tracks) which contain the second half of the frame of the NTSC digital video signal in the SP mode. That is, sync blocks SB4 and SB10 of tracks T0–T4 and of tracks T5–T9 of the NTSC digital video signal recorded in the LP mode represent date information similar to the date information included in sync blocks SB4 and SB10 of tracks T5–T9 of the NTSC digital video signal recorded in the SP mode. Likewise, sync blocks SB5 and SB11 of tracks T0–T4 and of tracks T5–T9 of the NTSC digital video signal recorded in the LP mode include the same time data as are included in sync blocks SB5 and SB11 of tracks T5–T9 for the NTSC digital video signal recorded in the SP mode. Stated otherwise, whereas each frame of the digital video signal recorded in the SP mode is comprised of first and second sets of tracks, each set including an equal number of tracks (e.g. five tracks for the NTSC standard and six tracks for the PAL standard), one frame recorded in the LP mode is comprised of only a single set of tracks (five tracks in the NTSC standard and six tracks in the PAL standard). The subcode data that is recorded in the set of tracks which constitute a frame in the LP mode is the same type of data as the subcode data that is recorded in the second set of tracks (i.e. the second half) which are included in the frame of the SP-recorded video data. Although subcode data of first and second types are recorded in the first and second sets of the tracks which constitute an SP frame, only one type of subcode data is recorded in an LP frame.

Figure 18:
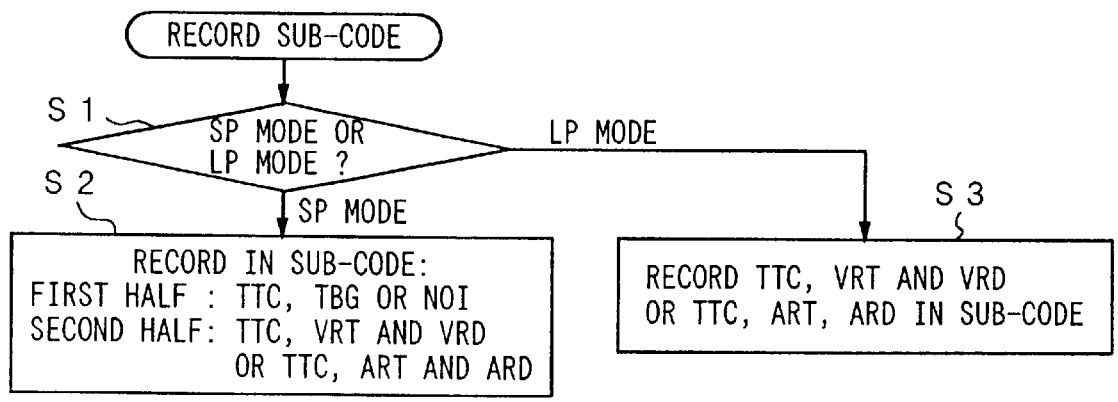
FIG. 18 is a flow chart representing the manner in which the subcode data shown in FIG. 16

FIG. 18 illustrates a flow chart that characterizes the manner in which subcode generator 10 of FIG. 9 records the subcode data. That is, the flow chart of FIG. 18 represents the manner in which either the subcode data shown in FIG. 16 or the subcode data shown in FIG. 17 is recorded. Initially, inquiry S1 is made to determine whether the apparatus shown in FIG. 9 is operable in the SP or LP mode. It is recalled that a user operates entry key 12 to select either the SP mode or the LP mode of operation. If the user had selected the SP mode, instruction S2 is carried out, whereby subcode generator 10 generates the TTC pack for recording in sync blocks SB3, SB5, SB9 and SB11 in the first half of the frame of digital video data (i.e. in tracks T0–T4) and also generates the TTC or TBG packs (or NOI) in sync blocks SB4 and SB10. During the second half of the video frame, that is, when tracks T5–T9 are recorded, subcode generator 10 generates the TTC pack for recording in sync blocks SB3 and SB9 and then generates either time data (VRT or ART packs) or date data (VRD or ARD packs), or NOI, for recording in sync blocks SB5, SB11 and in sync blocks SB4, SB10, as depicted in FIG. 16.

If, however, the user had selected the LP mode for recording, instruction S3 is executed, whereby subcode generator 10 generates the TTC data pack for recording in sync blocks SB3 and SB9 in each track and then generates time data VRT or ART packs for recording in sync blocks SB5 and SB11 in each track or generates date data VRD or ARD packs for recording in sync blocks SB4 and SB10 in each track. Thus, depending upon whether the user selects the SP or LP mode for recording, the subcode data is recorded in the format shown either in FIG. 16 or in FIG. 17.

It is appreciated that, if the LP mode of recording is selected, the TBG pack is not recorded. This is acceptable because the TBG pack typically is reserved for business use recording and not for consumer use. Since the quality of the video picture ultimately reproduced from compressed video data that had been recorded in the LP mode is less than the quality of the video picture that is reproduced from the compressed video data that had been recorded in the SP mode, it is expected that, when the LP mode is used, that is, when consumer use of the D-VCR is implemented, there is no need to record the TBG pack. Thus, the omission of the TBG pack from the subcode data recorded during the LP mode is acceptable; and no problem therefrom is expected.

Figure 19:
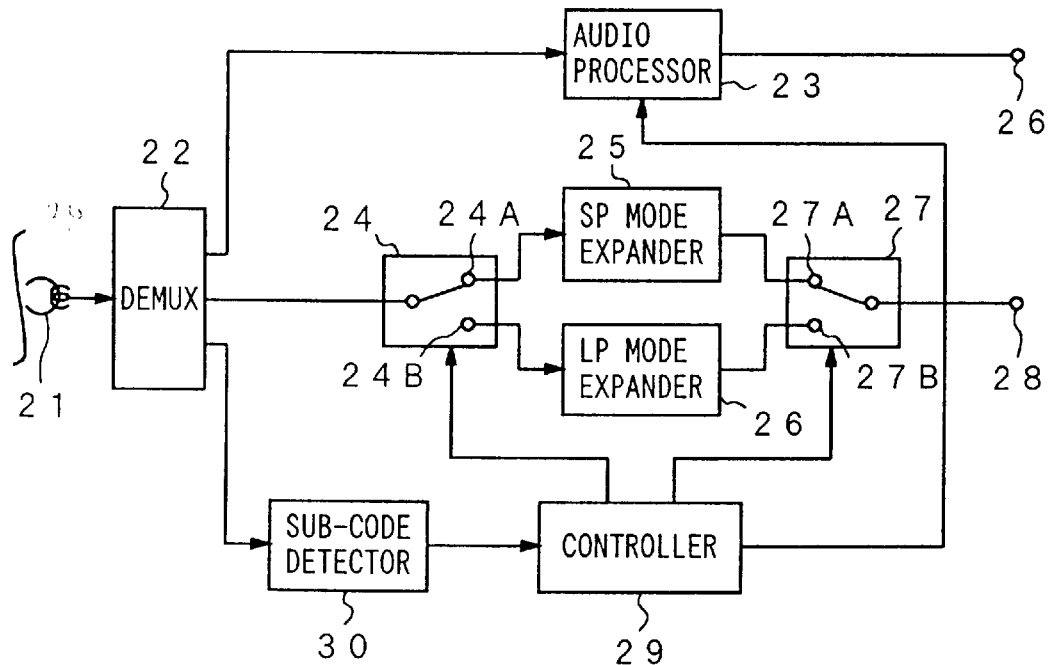
FIG. 19 is a block diagram of video data reproducing apparatus in which the present invention finds ready application.

FIG. 19 is a block diagram of digital video reproducing apparatus that is compatible with the recording apparatus shown in FIG. 9 and wherein the present invention finds ready application. Here, the digital video signal that had been recorded on magnetic tape 20 in either the SP or LP mode is reproduced by heads 21 and supplied to a demultiplexer 22. The demultiplexer separates the reproduced data into separate audio, video and subcode channels supplied to an audio processor 23, a video selector 24 and a subcode detector 30, respectively. Audio processor 23 operates on the audio data supplied thereto to decompress the audio data, subject the decompressed audio data to interpolation, if necessary, and then supply the recovered audio data to an audio output terminal 26.

Subcode data detected by subcode detector 30 is supplied to a controller 29 and provides an indication thereto of whether the data recovered from tape 20 had been recorded in the SP or LP mode. For example, subcode detector 30 may sense the absence from main areas in, for example, tracks T0–T4 of date and/or time data to indicate the presence of digital video data that had been recorded in the SP mode, as seen in FIG. 16. If the subcode detector senses the presence of date and/or time data in the subcode area in each track, subcode detector 30 thus provides controller 29 with an indication that the digital video data had been recorded in the LP mode, as best appreciated from FIG. 17. Controller 29 supplies a suitable SP/LP control signal to audio processor 23 and to selectors 24 and 27, thereby controlling these circuits in a manner compatible with SP or LP recorded data.

Selector 24 couples video data either to an SP mode expander 25 or to an LP mode expander 26, depending upon whether controller 29 sets the state of selector 24 to the SP or LP state, as determined by subcode detector 30. Similarly, selector 27 couples either the SP mode expander or the LP mode expander to a video output terminal 28, depending upon whether controller 29 is provided with an SP or LP indication from the subcode detector. Thus, depending upon whether the original digital video signal had been compressed and recorded in the SP or LP mode, that video signal, when reproduced from tape 20, is expanded in a compatible manner.

Although not shown herein, it will be appreciated that SP mode expander 25 and LP mode expander 26 include variable length decoders, inverse quantizers and inverse DCT circuits known to those of ordinary skill in the art. Thus, the digital video data that had been compressed by compressors 5 and 6 in FIG. 9 now are expanded by matching expander circuits 25 and 26, respectively.

The subcode data detected by subcode detector 30 is used during a high speed search to locate desired frames and to position tape 20 such that the beginning of a selected frame is located for reproduction by head 21. The subcode data sensed during a high speed search also is used for compilation of, for example, titles of video programs recorded on tape 20, dates and/or times of recording, duration, etc. Such information may be displayed to the user to simplify his selection of desired frames to be reproduced.

Figure 20:
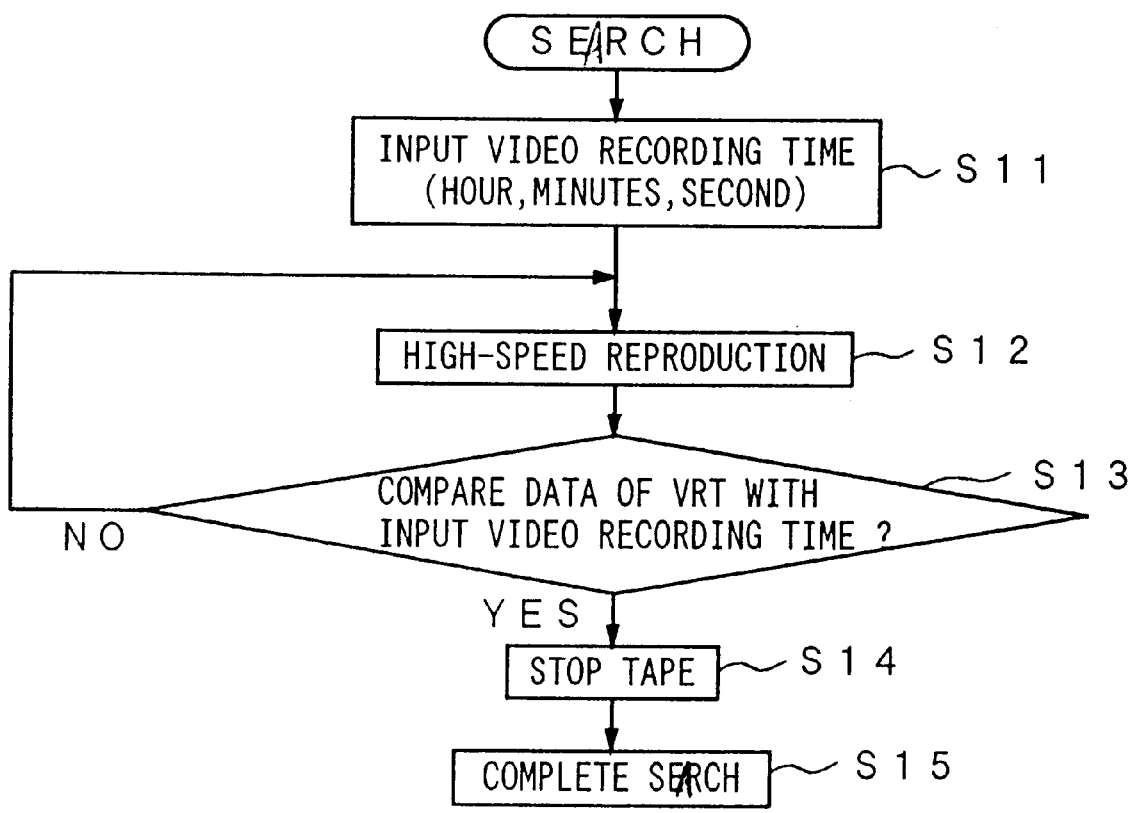
FIG. 20 is a flow chart illustrating the manner in which a high speed search is carried out.

FIG. 20 is a flow chart representing the manner in which a high speed search for a desired frame is executed. Initially, the user enters the identity of the frame in question by supplying to, for example, subcode detector 30 (or controller 29) the desired time (in hours, minutes and seconds) at which the frame in question was recorded. This inputting of time data is represented by instruction S11 in FIG. 20. Then, a high speed search is carried out whereby subcode data recorded in the respective tracks is played back, as represented by instruction S12. The played back VRT packs are compared to the user-entered input time, as represented by inquiry S13, and the routine simply cycles through instruction S12 and inquiry S13 until the reproduced VRT pack coincides with the user-entered time. When inquiry S13 detects this coincidence, the movement of tape 20 is stopped, as represented by instruction S14, and the high speed search is completed. Then, as represented by instruction S15, a fine search is carried out to move the tape to the first track of the first frame recorded at the user-entered time.

The foregoing search may be carried out by comparing the user-entered time to ART packs that are reproduced from the tape. Alternatively, the user may enter a recording date; and inquiry S13 operates to compare the VRD or ARD packs with the user-entered date. Still further, the high speed search represented by the flow chart shown in FIG. 20 may be implemented by comparing user-entered date and time to VRD and VRT packs or to ARD and ART packs that are recovered from the subcode area in each track scanned at high speed during this high speed search.

It is appreciated that when the video data is recorded in the SP mode, VRT or VRD (or, alternatively, ARD or ART) packs are recorded in the subcode area included in each frame, even though this data is not recorded in each track. Likewise, when the digital video data is recorded in the LP mode, the VRT or VRD (or, alternatively, the ART or ARD) packs likewise are recorded in each frame. Thus, a high speed search based upon VRT, VRD, ART or ARD packs is carried out on the basis of a single frame unit irrespective of whether the video data was recorded in the SP or LP mode. Consequently, the same high speed searching mechanism or algorithm may be used for both SP and LP reproduction. Heretofore, as discussed above, one type of search mechanism or algorithm must be used when the digital video data had been recorded in the SP mode and another search mechanism or algorithm must be used when the video data had been recorded in the LP mode. Accordingly, by reason of the present invention, the searching mechanism or algorithm may be simplified because separate mechanisms or algorithms need not be provided for the SP and LP modes, respectively.

FIG. 21 schematically represents a problem that would be present if the prior art technique is used to record both SP and LP subcode data. That is, if the technique used to record subcode data for the SP mode also is used to record data for the LP mode, it is seen that, when the NTSC standard is adopted, the subcode data recorded in the first set of five tracks T0–T4 (which constitute a complete LP frame) differs from the subcode data recorded in the second set of tracks T5–T9 (which constitute a next-following complete LP frame). That is, in tracks T0–T4 of FIG. 21, VRD or VRT (or, alternatively, ARD or ART) packs are not recorded and, thus, a search based upon this data, such as represented by the flow chart shown in FIG. 20, will not be capable of positioning those frames constituted by tracks T0–T4. When the prior art technique of recording subcode data in the SP mode is used to record subcode data in the LP mode, a high speed search will sense only every other frame; whereas the present invention permits a high speed search to sense every LP frame. Using the prior art technique, a high speed search is dependent upon a 2-frame unit, whereas the present invention permits a high speed search to be conducted for a single frame unit.

While FIGS. 16, 17 and 21 illustrate SP and LP recording of NTSC (525/60) video signals, it is appreciated that the present invention is equally applicable to the recording of PAL (625/50) video signals. When PAL signals are recorded in the SP mode, each frame is constituted by twelve tracks; and when recorded in the LP mode, each PAL frame is constituted by six tracks. Nevertheless, the teachings and principles of the instant invention are applicable to such PAL signals.

Figures 6A, 6B:
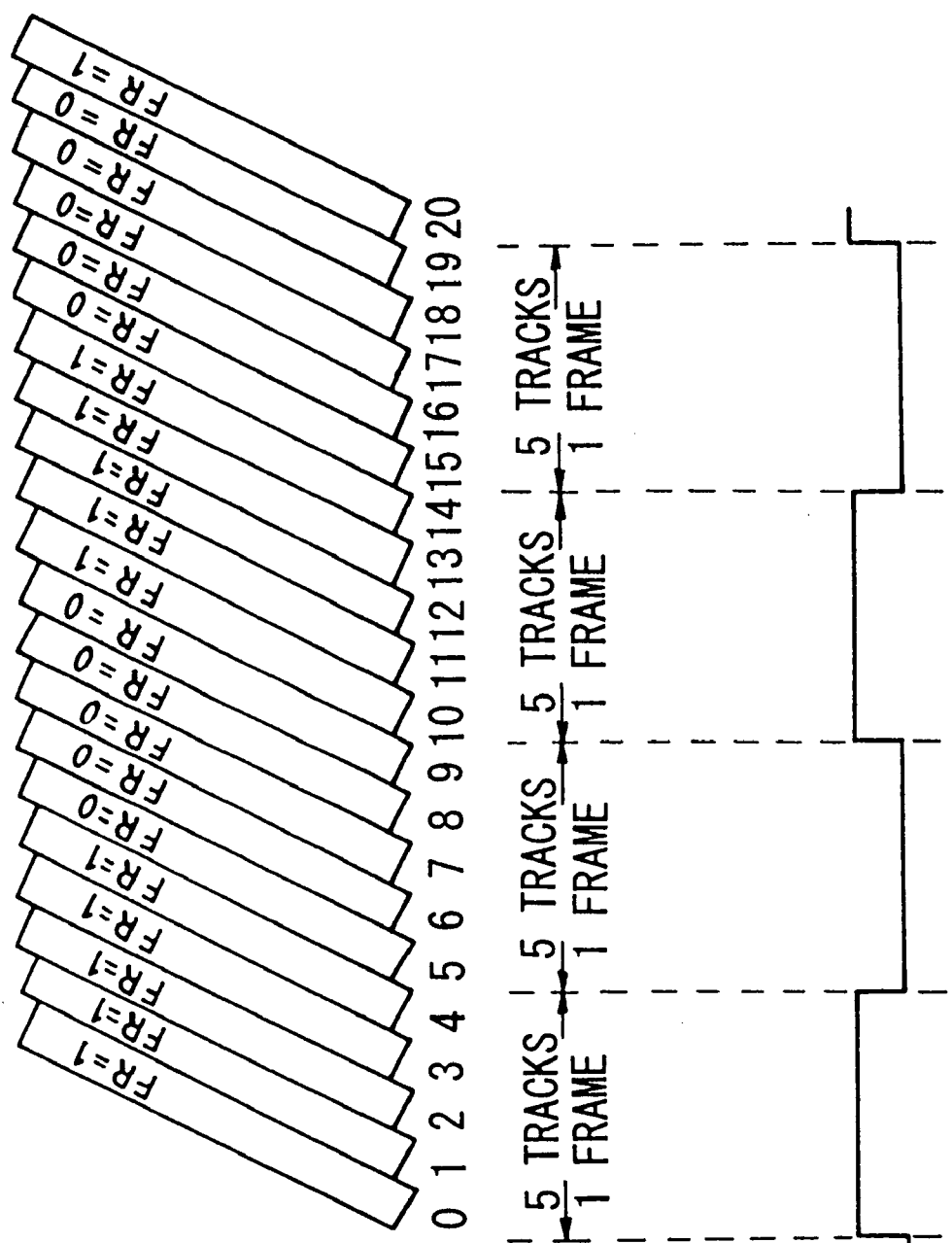
FIGS. 6A and 6B are schematic representations of the F/R flag recorded in respective tracks of video frames that had been recorded in the LP mode of operation.
Figure 7:
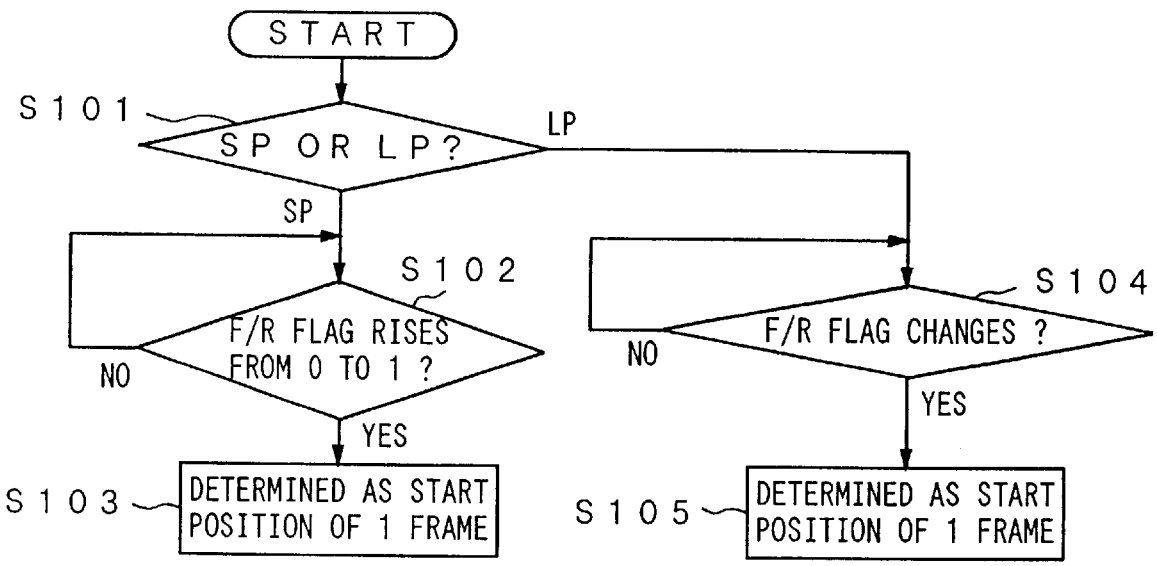
FIG. 7 is a flow chart representing the manner in which the F/R flag is sensed for the purpose of positioning a record medium at the beginning of a frame recorded in the SP or LP mode.
Figure 22:
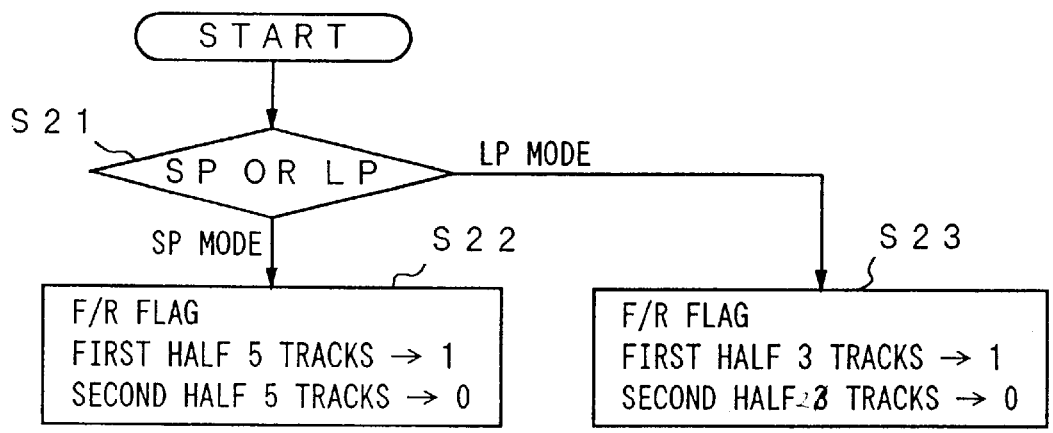
FIG. 22 is a flow chart representing one embodiment of the present invention in which the F/R flag is recorded in either the SP or LP mode.

As discussed above, particularly in conjunction with FIGS. 5A and 5B, when the NTSC video signal is recorded in the SP mode, the F/R flag included in the ID0 byte of each sync block is a "1" for tracks T0–T4 and is a "0" for tracks T5–T9. That is, the F/R flag undergoes a positive transition at the first track in the frame and undergoes a negative transition at the first track in the second set of tracks in that frame. When the NTSC signal is recorded in the LP mode, it is preferred that the F/R flag in each sync block undergo a positive transition at the first track in each frame. However, if the technique that is used to record subcode data in the SP mode also is used to record subcode data in the LP mode, it is seen, from FIGS. 6A–6B, that the F/R flag undergoes a positive transition at the first track in alternate frames but undergoes a negative transition at the first track in the remaining frames. However, since a positive transition in the F/R flag typically is used to identify the beginning of a frame, it is preferable to have this flag undergo a positive transition at the beginning of each frame recorded in the LP mode and not simply at the beginning of alternate frames, as represented by FIG. 6B. This preferred control over the F/R flag in both the SP and LP recording modes is depicted by the flow chart shown in FIG. 22.

This flow chart represents the recording of the digital video signal in the NTSC standard. Initially, inquiry S21 determines whether the digital video signal is to be recorded in the SP or LP mode, as selected by the user. If the SP mode is selected, instruction S22 is carried out, wherein the F/R flag is set at "1" for the first set of five tracks which constitute half the SP frame; and then this flag is changed over to "0" for the second set of five tracks which comprise the remainder of the frame. However, if the user selects the LP mode of recording, instruction S23 is carried out, wherein the F/R flag is set to "1" for the first three tracks which constitute the LP frame; and then the flag is changed over to "0" for the remaining two tracks of the LP frame. Alternatively, if the digital video signal is in the PAL standard, instruction S22 sets the F/R flag to "1" for the first set of six tracks in the SP frame and to "0" for the second set of six tracks for the SP frame. For recording the signal in the LP mode, instruction S23 sets the F/R flag to "1" for the first three tracks of the LP frame and to "0" for the last three tracks of the LP frame.

From the foregoing, it may be generalized that, when a digital video signal is recorded in the SP mode, wherein a frame consists of M tracks, the F/R flag changes over from one state to the other at every M/2 tracks. For recording in the LP mode, wherein a frame is recorded in M/2 tracks, if the digital video signal is an NTSC signal, the F/R flag preferably is set to "1" for (M/2+1)/2 tracks and is set to "0" for the remaining tracks. Of course, if the digital video signal is in the PAL standard, the F/R flag is set to "1" for the first three tracks of the LP frame and to "0" for the last three tracks of the LP frame. That is, for the LP mode, the F/R flag undergoes a change in state at the first and N-th tracks of each frame, where $(1/2)(M/2+1) \geq N \geq (1/2)(M/2-1)$. Consequently, whether the digital video signal is recorded in the SP or LP mode, the beginning of a frame, that is, the first track in a frame, can be detected simply by sensing the changeover in the F/R flag from "0" to "1". Hence, a common searching mechanism or algorithm may be used in both the SP and LP modes to sense the beginning of a frame.

Figure 23:
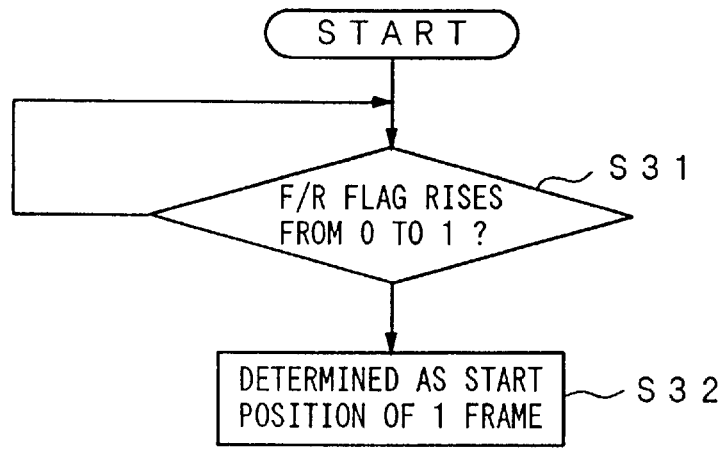
FIG. 23 is a flow chart representing the manner in which the beginning of a frame is sensed as a function of the F/R flag, irrespective of whether the video data had been recorded in the SP or LP mode.

FIG. 23 is a flow chart which represents the manner in which the beginning of a frame of a digital video signal that had been recorded in either the SP or LP mode is determined. Inquiry S31 is made to sense when the F/R flag undergoes a transition from "0" to "1". When this transition is sensed, instruction S32 is executed to indicate that the track which contains this transition is the first track of the frame, irrespective of whether that frame was recorded in the SP or LP mode.

Figures 24A, 24B:
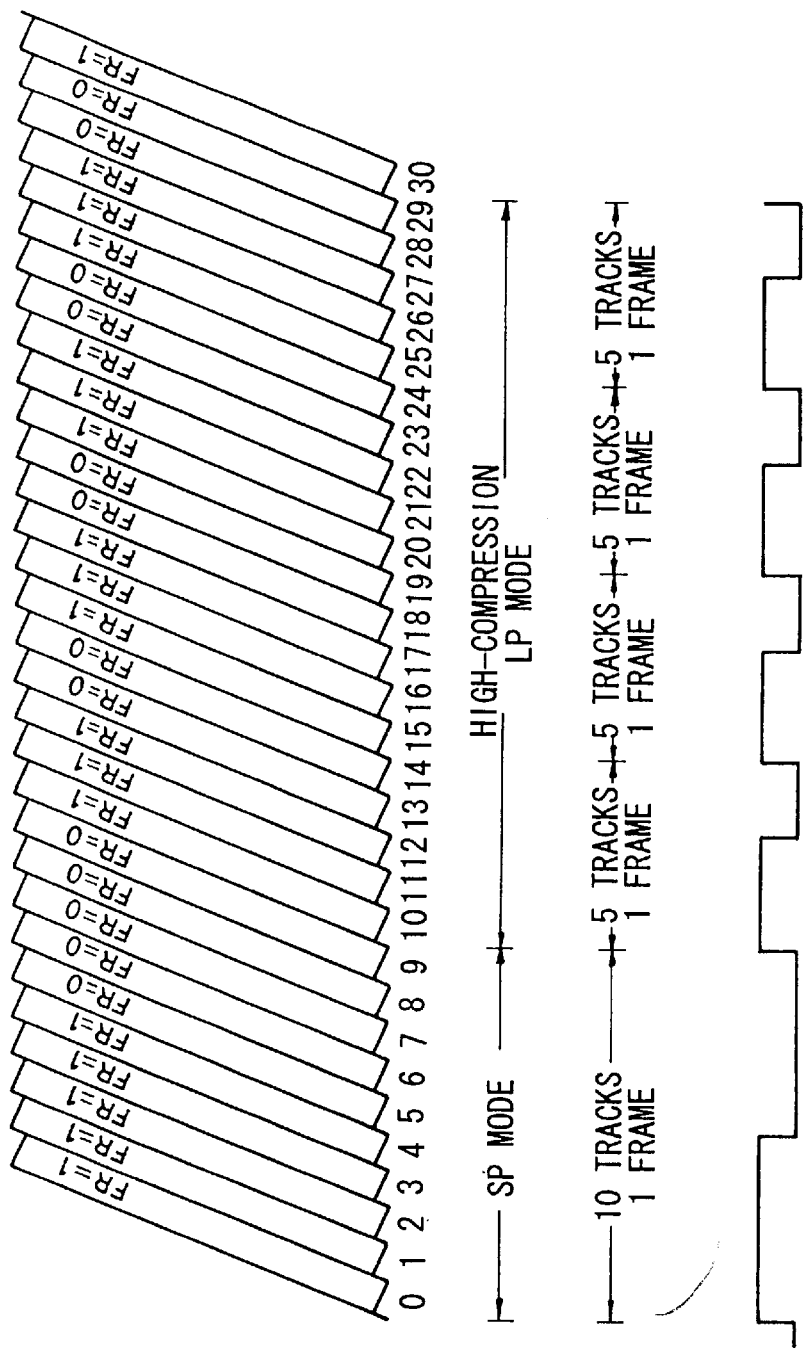
FIGS. 24A–24B schematically illustrate the F/R flag that is recorded in accordance with the present invention on a video tape containing video data that had been recorded in both the SP and LP modes.

FIGS. 24A and 24B schematically illustrate an NTSC digital video signal that is recorded on a magnetic tape in the SP mode for tracks 0–9 and in the LP mode for tracks 10–30. The state of the F/R flag in each track also is depicted; and FIG. 24B illustrates the transition of this flag. It is seen that, consistent with the present invention, the F/R flag undergoes a positive transition at the beginning of each frame, whether that frame is recorded in the SP mode (as in tracks 0–9) or in the LP mode (as in tracks 10–14, 15–19, 20–24 and 25–29). In the LP mode, consistent with the flow chart shown in FIG. 22, the F/R flag is set to "1" for the first three tracks of the LP frame and to "0" for the last two tracks of that frame.

While the foregoing has described the state of the F/R track as being "1" for the first three tracks and "0" for the last two tracks of an LP frame for an NTSC digital video signal, it will be appreciated that, alternatively, the F/R flag may be a "1" for the first two tracks and a "0" for the last three tracks.

The present invention also is applicable to the recording of "standard" and HDTV NTSC and PAL digital video signals in the SP mode. For example, when recording an HDTV NTSC signal (also known as the 1125/60 standard), the HDTV signal is recorded by compressor 6 (FIG. 9) in twenty tracks and the F/R flag undergoes a transition every ten tracks. That is, when recording the 1125/60 HDTV signal, the F/R flag is set to "1" in the first set of ten tracks and to "0" in the second set of ten tracks in the HDTV frame.

Similarly, when recording a PAL HDTV signal, also known as the 1250/50 standard, one frame of the HDTV signal is recorded in twenty-four tracks. Hence, the F/R flag is set to "1" in the first twelve tracks of the HDTV frame and to "0" in the second twelve tracks of that frame.

While the present invention has been particularly shown and described with reference to preferred embodiments, it will be readily appreciated by those of ordinary skill in the art that various changes may be made in form and details without departing from the spirit and scope of the invention. Some of these changes have been discussed above and others will be apparent from the teachings herein. Therefore, it is intended that the appended claims be interpreted to cover the embodiments specifically disclosed, those alternatives which have been mentioned and all equivalents thereto.

What is claimed is:

1. Apparatus for selectively recording a digital video signal in a first number of tracks on a record medium in a standard play (SP) mode and in a second number of tracks in a long play (LP) mode wherein each frame of the digital video signal is recorded in first and second sets of tracks in said SP mode and in said first set of tracks in said LP mode, and wherein subcode data is recorded in said first and second sets of tracks for locating frames during a high speed search, said apparatus comprising:

first and second video data compressing means for compressing said digital video signal for recording in said SP and LP modes, respectively, said second video data compressing means exhibiting a compression ratio greater than the compression ratio of said first video data compressing means;

selecting means for selecting said first or said second video data compressing means to supply the compressed digital video signal for recording; and subcode data generating means for generating subcode data of a first type for recording in said first set of tracks and of a second type for recording in said second set of tracks, whereby subcode data of said first and second types are recorded with a frame of compressed digital video signals in said SP mode and subcode data of only said first type are recorded with a frame of compressed digital video signals in said LP mode.

2. The apparatus of claim 1 wherein a frame of said compressed digital video signal is recorded in M tracks in the SP mode and in M/2 tracks in the LP mode.

3. The apparatus of claim 2 wherein a respective set of tracks consists of M/2 tracks.

4. The apparatus of claim 2 wherein said subcode data of said first type is recorded in M/2 tracks and contains both title time code data and recording time data; and wherein said subcode data of said second type is recorded in M/2 tracks and contains title time code data and not recording time data.

5. The apparatus of claim 3 wherein the digital video signal admits of a 525/60 standard and M=10.

6. The apparatus of claim 3 wherein the digital video signal admits of a 625/50 standard and M=12.

7. Apparatus for reproducing a compressed digital video signal that had been recorded with a first compression ratio in a standard play (SP) mode in a first number of tracks on a record medium and that had been recorded with a second compression ratio in a long play (LP) mode in a second number of tracks, said first number being greater than said second number, wherein each frame of the digital video signal is disposed in first and second sets of tracks in said SP mode and in said first set of tracks in said LP mode, and wherein subcode data is recorded in said first and second sets of tracks for locating frames during a high speed search of the record medium, said subcode data in said first set of tracks being of a first type and said subcode data in said second set of tracks being of a second type, said apparatus comprising:

first and second video data expanding means for expanding said compressed digital video signal reproduced from said record medium in said SP and LP modes, respectively;

selecting means for selecting said first or second video data expanding means to expand the compressed digital video signal reproduced from said record medium; and subcode data detecting means for detecting the subcode data reproduced from said first set of tracks in both the SP and LP modes to carry out said high speed search.

8. The apparatus of claim 7 wherein a frame of said compressed digital video signal is disposed in M tracks in the SP mode and in M/2 tracks in the LP mode.

9. The apparatus of claim 8 wherein each of said first and second sets of tracks consists of M/2 tracks.

10. The apparatus of claim 9 wherein the digital video signal admits of a 525/60 standard and M=10.

11. The apparatus of claim 9 wherein the digital video signal admits of a 625/50 standard and M=12.

12. The apparatus of claim 8 wherein said subcode data of said first type is recorded in M/2 tracks and contains both title time code data and recording time data; and wherein said subcode data of said second type is recorded in M/2 tracks and contains title time code data and not recording time data.

13. Apparatus for selectively recording a digital video signal in a first number (M) of tracks on a record medium in a standard play (SP) mode and in a second number (M/2) of tracks in a long play (LP) mode, wherein a frame of the digital video signal is distributed throughout first and second sets of M/2 tracks in said SP mode and throughout said first set of M/2 tracks in said LP mode, and wherein subcode data is recorded in said first and second sets of tracks, said apparatus comprising:

first and second video data compressing means for compressing said digital video signal for recording in said SP and LP modes, respectively, said second video data compressing means exhibiting a compression ratio greater than the compression ratio of said first video data compressing means;

selecting means for selecting said first or said second video data compressing means to supply the compressed digital video signal for recording; and subcode data generating means for generating subcode data for recording in said first and second sets of tracks, in which said subcode data includes a flag whose state is changed in a first direction at the first track in the first set of tracks and in a second direction at the first track in the second set of tracks when the compressed digital video signal is recorded in the SP mode and the state of said flag is changed in said first direction at the first track in said first set of tracks and in said second direction at the Nth track in said first set where (1/2) (M/2+1)≧N≧(1/2) (M/2−1) when the compressed digital video signal is recorded in the LP mode such that the change in the state of said flag in said first direction corresponds to a beginning of a respective frame regardless of whether the compressed digital video signal is recorded in the SP mode or the LP mode.

14. The apparatus of claim 13 wherein the digital video signal admits of a 525/60 standard; M=10; and the state of said flag changes in said first direction at the beginning of a frame and in said second direction five tracks later when the compressed digital video signal is recorded in the SP mode, and said state changes in said first direction at the beginning of a frame and in said second direction three tracks later when the compressed digital video signal is recorded in the LP mode.

15. The apparatus of claim 13 wherein the digital video signal admits of a 525/60 standard; M=10; and the state of said flag changes in said first direction at the beginning of a frame and in said second direction five tracks later when the compressed digital video signal is recorded in the SP mode, and said state changes in said first direction at the beginning of a frame and in said second direction two tracks later when the compressed digital video signal is recorded in the LP mode.

16. The apparatus of claim 13 wherein the digital video signal admits of a 625/50 standard; M=12; and the state of said flag changes in said first direction at the beginning of a frame and in said second direction six tracks later when the compressed digital video signal is recorded in the SP mode, and said state changes in said first direction at the beginning of a frame and in said second direction three tracks later when the compressed digital video signal is recorded in the LP mode.

17. Apparatus for reproducing a compressed digital video signal that had been recorded with a first compression ratio in a standard play (SP) mode in a first number (M) of tracks on a record medium and that had been recorded with a second compression ratio greater than said first compression ratio in a long play (LP) mode in a second number (M/2) of tracks, wherein a frame of the digital video signal is distributed throughout first and second sets of M/2 tracks in said SP mode and throughout said first set of M/2 tracks in said LP mode, and wherein subcode data containing a flag is recorded in said first and second sets of tracks, in which said flag changes state in a first direction at the first track in the first set of tracks and in a second direction at the first track in the second set of tracks when the compressed digital video signal is recorded in the SP mode and said flag changes state in said first direction at the first track in said first set of tracks and in said second direction at the Nth track of said first set of tracks when the compressed digital video signal is recorded in the LP mode where (1/2) (M/2+1)≧N≧(1/2) (M/2−1) such that the change in the state of said flag in said first direction corresponds to a beginning of a respective frame regardless of whether the compressed digital video signal had been recorded in the SP mode or the LP mode; said apparatus comprising:

first and second video data expanding means for expanding the compressed digital video signal reproduced from said record medium in the SP and LP modes, respectively;

selecting means for selecting said first or second video data expanding means to expand the reproduced compressed digital video signal; and subcode data detecting means for detecting the subcode data in said first and second sets of tracks and responsive to a change in the state of said flag in said first direction to indicate the beginning of a frame in both the SP and LP modes.

18. The apparatus of claim 17 wherein the digital video signal admits of a 525/60 standard; M=10; and the state of said flag changes in said first direction at the beginning of a frame and in said second direction five tracks later when the compressed digital video signal is recorded in the SP mode, and said state changes in said first direction at the beginning of a frame and in said second direction three tracks later when the compressed digital video signal is recorded in the LP mode.

19. The apparatus of claim 17 wherein the digital video signal admits of a 525/60 standard; M=10; and the state of said flag changes in said first direction at the beginning of a frame and in said second direction five tracks later when the compressed digital video signal is recorded in the SP mode, and said state changes in said first direction at the beginning of a frame and in said second direction two tracks later when the compressed digital video signal is recorded in the LP mode.

20. The apparatus of claim 17 wherein the digital video signal admits of a 625/50 standard; M=12; and the state of said flag changes in said first direction at the beginning of a frame and in said second direction six tracks later when the compressed digital video signal is recorded in the SP mode, and said state changes in said first direction at the beginning of a frame and in said second direction three tracks later when the compressed digital video signal is recorded in the LP mode.

21. Apparatus for selectively recording a digital video signal in a first number (M) of tracks on a record medium in a standard play (SP) mode and in a second number (2M) of tracks in a HDTV mode, wherein a frame of the digital video signal is distributed throughout a first set of M tracks in said SP mode and throughout first and second sets of M tracks in said HDTV mode, and wherein subcode data is recorded in said first and second sets of tracks, said apparatus comprising:

first and second video data compressing means for compressing said digital video signal for recording in said SP and HDTV modes, respectively;

selecting means for selecting said first or said second video data compressing means to supply the compressed digital video signal for recording; and subcode data generating means for generating subcode data for recording in said first and second sets of tracks, in which said subcode data includes a flag whose state is changed in a first direction at the first track in the first set of tracks and in a second direction at the first track in the second set of tracks when the compressed digital video signal is recorded in the HDTV mode and in said first direction at the first track and in said second direction at the M/2-th track in said first set when the compressed digital video signal is recorded in the SP mode such that the change in the state of said flag in said first direction corresponds to a beginning of a respective frame regardless of whether the compressed digital video signal is recorded in the SP mode or the HDTV mode.

22. The apparatus of claim 21 wherein the digital video signal admits of a 525/60 standard and M=10.

23. The apparatus of claim 21 wherein the digital video signal admits of a 625/50 standard and M=12.

24. Apparatus for reproducing a compressed digital video signal that had been recorded with a first compression ratio in a standard play (SP) mode in a first number (M) of tracks on a record medium and that had been recorded with a second compression ratio in a HDTV mode in a second number (2M) of tracks, wherein a frame of the digital video signal is distributed throughout first and second sets of M tracks in said HDTV mode and throughout said first set of M tracks in said SP mode, and wherein subcode data containing a flag is recorded in said first and second sets of tracks, in which said flag changes state in a first direction at the first track in the first set of tracks and in a second direction at the first track in the second set of tracks when the compressed digital video signal is recorded in the HDTV mode and said flag changes state in said first direction at the first track in said first set of tracks and in said second direction at the M/2-th track of said first set of tracks when the compressed digital video signal is recorded in the SP mode such that the change in the state of said flag in said first direction corresponds to a beginning of a respective frame regardless of whether the compressed digital video signal had been recorded in the SP mode or the HDTV mode, said apparatus comprising:

first and second video data expanding means for expanding the compressed digital video signal reproduced from said record medium in the SP and HDTV modes, respectively;

selecting means for selecting said first or second video data expanding means to expand the reproduced compressed digital video signal; and subcode data detecting means for detecting the subcode data in said first and second sets of tracks and responsive to a change in the state of said flag in said first direction to indicate the beginning of a frame in both the SP and HDTV modes.

25. The apparatus of claim 13, wherein said first direction is one of a positive direction and a negative direction and said second direction is the other of said positive direction and said negative direction, in which said positive direction represents a positive change in the state of said flag from an immediately preceding track to the respective track and said negative direction represents a negative change in the state of said flag from an immediately preceding track to the respective track.

26. The apparatus of claim 17, wherein said first direction is one of a positive direction and a negative direction and said second direction is the other of said positive direction and said negative direction, in which said positive direction represents a positive change in the state of said flag from an immediately preceding track to the respective track and said negative direction represents a negative change in the state of said flag from an immediately preceding track to the respective track.

27. The apparatus of claim 21, wherein said first direction is one of a positive direction and a negative direction and said second direction is the other of said positive direction and said negative direction, in which said positive direction represents a positive change in the state of said flag from an immediately preceding track to the respective track and said negative direction represents a negative change in the state of said flag from an immediately preceding track to the respective track.

28. The apparatus of claim 24, wherein said first direction is one of a positive direction and a negative direction and said second direction is the other of said positive direction and said negative direction, in which said positive direction represents a positive change in the state of said flag from an immediately preceding track to the respective track and said negative direction represents a negative change in the state of said flag from an immediately preceding track to the respective track.

* * * * *

UNITED STATES PATENT AND TRADEMARK OFFICE
CERTIFICATE OF CORRECTION

PATENT NO. : 6,026,212
DATED : Feb. 15, 2000
INVENTOR(S) : Oguro

It is certified that error appears in the above-identified patent and that said Letters Patent is hereby corrected as shown below:

On the title page, item

Under [30]   Foreign Application Priority Data
for Japanese Application 6-337379

Change "Dec. 26, 1997" to --Dec. 26, 1994--

Signed and Sealed this

Third Day of April, 2001

Attest:

NICHOLAS P. GODICI

*Attesting Officer*   *Acting Director of the United States Patent and Trademark Office*